United States Patent
Powell (10) Patent No.: US 10,745,299 B2
(45) Date of Patent: Aug. 18, 2020

(54) STRUVITE FORMATION BY PRECIPITATION OF AMMONIA IN ELECTROCOAGULATION PROCESS

(71) Applicant: NiBru Traka, Inc., Strasburg, CO (US)

(72) Inventor: Scott W. Powell, Aurora, CO (US)

( * ) Notice: Subject to any disclaimer, the term of this patent is extended or adjusted under 35 U.S.C. 154(b) by 57 days.

(21) Appl. No.: 15/600,551

(22) Filed: May 19, 2017

(65) Prior Publication Data

US 2017/0260066 A1  Sep. 14, 2017

Related U.S. Application Data (63) Continuation-in-part of application No. 13/774,956, filed on Feb. 22, 2013.

(51) Int. Cl.
| | | |
|---|---|---|
| *C02F 1/463* | (2006.01) | |
| *C02F 11/16* | (2006.01) | |
| *C02F 101/16* | (2006.01) | |

(52) U.S. Cl.
CPC .............. *C02F 1/463* (2013.01); *C02F 11/16* (2013.01); *C02F 2101/16* (2013.01); *C02F 2201/4617* (2013.01)

(58) Field of Classification Search
CPC .................................................. C02F 1/463; C02F 2101/16; C02F 2101/163; C02F 2101/166; C02F 2201/46; C02F 2201/461; C02F 2201/46105; C02F 2201/4617
See application file for complete search history.

(56) References Cited

U.S. PATENT DOCUMENTS

| | | |
|---|---|---|
| 284,862 A | 9/1883 | Lackersteen |
| 2,182,145 A | 12/1939 | Eddy |
| 2,732,944 A | 1/1956 | Hays |
| 3,293,861 A | 12/1966 | Hinde |
| 3,340,175 A | 9/1967 | Mehl |
| 3,768,200 A | 10/1973 | Klock |
| 3,788,967 A | 1/1974 | Kawahata et al. |
| 3,793,173 A | 2/1974 | Kawahata et al. |
| 3,882,635 A | 5/1975 | Yamanaka et al. |
| 3,925,176 A | 12/1975 | Okert |
| 3,955,316 A | 5/1976 | Drossbach |
| 3,955,318 A | 5/1976 | Hulls |

(Continued)

FOREIGN PATENT DOCUMENTS

| | | |
|---|---|---|
| AU | 8059182 A | 9/1982 |
| AU | 569026 B2 | 1/1988 |

(Continued)

OTHER PUBLICATIONS

Peter K. Holt, et al., "The future for electrocoagulation as a localized water treatment technology," Chemosphere, 59:355-367 (Year: 2005).*

(Continued)

*Primary Examiner* — Patrick Orme
(74) *Attorney, Agent, or Firm* — Berg Hill Greenleaf Ruscitti, LLP (57) ABSTRACT

A system and method is provided for the remediation of wastewater by electrocoagulation. The system and method are directed to the precipitation of ammonia resulting in the formation of struvite. According to another embodiment, the method also results in precipitation of nitrogen compounds including nitrates, nitrites, and urea.

21 Claims, 6 Drawing Sheets

(56) References Cited

U.S. PATENT DOCUMENTS

| | | |
|---|---|---|
| 3,966,567 A | 6/1976 | Pace et al. |
| 4,005,546 A | 2/1977 | Oswald |
| 4,036,726 A | 7/1977 | Gale et al. |
| 4,119,520 A | 10/1978 | Paschakarnis et al. |
| 4,125,467 A | 11/1978 | Haddad et al. |
| 4,176,038 A | 11/1979 | Moeglich |
| 4,209,388 A | 6/1980 | DeFraites |
| 4,253,271 A | 3/1981 | Raymond |
| 4,267,038 A | 5/1981 | Thompson |
| 4,293,400 A | 10/1981 | Liggett |
| 4,316,961 A | 2/1982 | Klass et al. |
| 4,321,125 A | 3/1982 | Nazarian et al. |
| 4,329,211 A | 5/1982 | Plantes et al. |
| 4,432,869 A | 2/1984 | Groeneweg et al. |
| 4,450,060 A | 5/1984 | Gonzalez |
| RE31,924 E | 6/1985 | Starr |
| 4,623,436 A | 11/1986 | Umehara |
| 4,708,809 A | 11/1987 | Davis |
| 4,770,755 A | 9/1988 | Valanti et al. |
| 4,790,923 A | 12/1988 | Stillman |
| 4,872,959 A | 10/1989 | Herbst et al. |
| 4,919,775 A | 4/1990 | Ishigaki |
| 4,966,713 A | 10/1990 | Keys et al. |
| 5,011,604 A | 4/1991 | Wilde et al. |
| 5,013,435 A | 5/1991 | Rider et al. |
| 5,043,050 A | 8/1991 | Herbst |
| 5,087,353 A | 2/1992 | Todd et al. |
| 5,227,071 A | 7/1993 | Torline et al. |
| 5,248,424 A | 9/1993 | Cote et al. |
| 5,277,814 A | 1/1994 | Winter et al. |
| 5,302,273 A | 4/1994 | Kemmerer |
| 5,423,962 A | 6/1995 | Herbst |
| 5,447,850 A | 9/1995 | McCann |
| 5,472,472 A | 12/1995 | Northrop |
| 5,525,126 A | 6/1996 | Basu et al. |
| 5,549,812 A | 8/1996 | Witte |
| 5,571,399 A | 11/1996 | Allen |
| 5,611,907 A | 3/1997 | Herbst et al. |
| 5,622,864 A | 4/1997 | Buchanan |
| 5,627,069 A | 5/1997 | Powlen |
| 5,716,523 A | 2/1998 | Powlen |
| 5,741,426 A | 4/1998 | McCabe et al. |
| 5,744,041 A | 4/1998 | Grove |
| 5,755,852 A | 5/1998 | Northrop |
| 5,804,062 A | 9/1998 | Wyness |
| 5,866,019 A | 2/1999 | Wyness |
| 5,904,851 A | 5/1999 | Taylor et al. |
| 5,928,490 A | 7/1999 | Sweeney |
| 5,928,493 A | 7/1999 | Morkovsky et al. |
| 5,985,139 A | 11/1999 | Zoeller |
| 6,040,498 A | 3/2000 | Stomp et al. |
| 6,121,038 A | 9/2000 | Kirschner |
| 6,139,710 A | 10/2000 | Powell |
| 6,146,507 A | 11/2000 | Gustafson |
| 6,171,498 B1 | 1/2001 | Fassbender et al. |
| 6,214,617 B1 | 4/2001 | Herman |
| 6,238,546 B1 | 5/2001 | Knieper et al. |
| 6,267,888 B1 | 7/2001 | Satyanarayana |
| 6,277,279 B1 | 8/2001 | Hruza |
| 6,281,001 B1 | 8/2001 | McNelly |
| 6,325,916 B1 | 12/2001 | Lambert et al. |
| 6,325,934 B1 | 12/2001 | Tobey, Jr. et al. |
| 6,329,196 B1 | 12/2001 | Johnson et al. |
| 6,346,197 B1 | 2/2002 | Stephenson et al. |
| 6,350,350 B1 | 2/2002 | Jensen et al. |
| 6,358,398 B1 | 3/2002 | Halldorson et al. |
| 6,406,629 B1 | 6/2002 | Husain et al. |
| 6,416,993 B1 | 7/2002 | Wexler et al. |
| 6,465,240 B1 | 10/2002 | Wexler et al. |
| 6,471,869 B1 | 10/2002 | Yanou et al. |
| 6,488,835 B1 | 12/2002 | Powell |
| 6,645,385 B2 | 11/2003 | Krulik et al. |
| 6,689,271 B2 | 2/2004 | Morkovsky et al. |
| 6,719,894 B2 | 4/2004 | Gavrel et al. |
| 6,755,970 B1 | 6/2004 | Knappe et al. |
| 6,855,838 B2 | 2/2005 | Haas et al. |
| 6,890,451 B2 | 5/2005 | Sapienza et al. |
| 6,896,804 B2 | 5/2005 | Haerther et al. |
| 6,964,738 B1 | 11/2005 | Shen |
| 6,965,044 B1 | 11/2005 | Hammond et al. |
| 7,008,538 B2 | 3/2006 | Kasparian et al. |
| 7,211,185 B2 | 5/2007 | Powell |
| 7,264,732 B2 | 9/2007 | Bradley |
| 7,297,279 B2 | 11/2007 | Johnson et al. |
| 7,381,323 B2 | 6/2008 | Umezawa et al. |
| 7,404,900 B2 | 7/2008 | Bradley |
| 7,410,584 B2 | 8/2008 | Devine |
| 7,449,117 B2 | 11/2008 | Nakayama |
| 7,459,083 B1 | 12/2008 | Hong et al. |
| 7,666,234 B2 | 2/2010 | Ghosh et al. |
| 7,695,534 B2 | 4/2010 | Lawson et al. |
| 7,722,755 B2 | 5/2010 | Lawson et al. |
| 7,758,742 B2 | 7/2010 | Powell |
| 7,981,293 B2 | 7/2011 | Powell |
| 7,981,301 B2 | 7/2011 | Powell |
| 7,998,225 B2 | 8/2011 | Powell |
| 8,048,279 B2 | 11/2011 | Powell et al. |
| 8,133,382 B2 | 3/2012 | Powell |
| 8,192,617 B2 | 6/2012 | Powell |
| 2003/0106854 A1* | 6/2003 | Robinson ............... C02F 1/463 210/748.18 |
| 2003/0121864 A1 | 7/2003 | Kin et al. |
| 2003/0209489 A1 | 11/2003 | Haerther et al. |
| 2003/0213745 A1 | 11/2003 | Haerther et al. |
| 2004/0188348 A1 | 9/2004 | Yamasaki et al. |
| 2005/0045534 A1 | 3/2005 | Kin et al. |
| 2005/0081435 A1 | 4/2005 | Lastella |
| 2006/0111600 A1 | 5/2006 | Mecham |
| 2007/0278152 A1 | 12/2007 | Musale |
| 2009/0294353 A1* | 12/2009 | Massie ................... C02F 1/463 210/601 |
| 2009/0301963 A1 | 12/2009 | Brockmann et al. |
| 2010/0072131 A1 | 3/2010 | Nick et al. |
| 2010/0126869 A1 | 5/2010 | Wiemers |
| 2010/0314163 A1 | 12/2010 | Twardy et al. |
| 2012/0118035 A1* | 5/2012 | Zhao ..................... C05F 5/008 71/32 |
| 2014/0021057 A1* | 1/2014 | Berrak ................... C25B 1/18 205/345 |

FOREIGN PATENT DOCUMENTS

| | | |
|---|---|---|
| AU | 685260 B2 | 1/1998 |
| AU | 707432 B2 | 7/1999 |
| AU | 721834 B2 | 7/2000 |
| DE | 1526687 A1 | 2/1970 |
| DE | 2832664 A1 | 2/1980 |
| EP | 0803274 A1 | 10/1997 |
| GB | 1526687 A | 9/1978 |
| GB | 2172815 A | 10/1986 |
| GB | 2272171 A | 5/1994 |
| JP | S61164695 A | 7/1986 |
| JP | H07116667 A | 5/1995 |
| WO | 9400860 A1 | 1/1994 |
| WO | 9617667 A2 | 6/1996 |
| WO | 9640591 A1 | 12/1996 |
| WO | 9817589 A1 | 4/1998 |
| WO | 0153568 A1 | 7/2001 |
| WO | 03078035 A1 | 9/2003 |

OTHER PUBLICATIONS

"Aeration", Water Environment Federation and American Society of Civil Engineers; 1988; pp. 1-167.

"Clarifiers", Clarifier, Waste Treatment Clarifier, clarifiers, Met-Chem, Inc., web page, as early as Mar. 18, 2007, available at http://www.metchem.com/clarifier.htm, printed on Oct. 21, 2008. pp. 1-2.

"Electrocoagulation", Advertisement/Brochure for Cardia Technologies Ltd., as early as 1993, pp. 1-6.

"Electrocoagulation Report", Aquagy™, Sep. 2010, 7 pages.

(56) References Cited

OTHER PUBLICATIONS

"Memcor® Membranes. Quality. Reliability. Experience.", MEMCOR Products—Ultrafiltration and Microfiltration Water and Wastewater Systems, Siemens web pages, available at http://water.siemens.com/en/product_lines/memcor_products/Pages/default.aspx?g..., printed on Oct. 20, 2008, p. 1.
"Operating Instructions Manual—Open Chamber Electrocoagulation Demonstration Unit", Vortex™ Water Systems, LLC., dated Feb. 1998, pp. 1-14.
"Reverse Osmosis", Reverse Osmosis—Wikipedia, the free encyclopedia web page, as early as Apr. 4, 2004, available at http://en.wikipedia.org/wiki/Reverse_osmosis, printed on Oct. 22, 2008, pp. 1-6.
"Sewage treatment", Sewage treatment—Wikipedia, the free encyclopedia web page, last modified Oct. 21, 2008, available at http://wikipedia.org/wiki/Sewage_treatment, printed on Oct. 22, 2008, pp. 1-10.
"Ultrafiltration", Ultrafiltration—Wikipedia, the free encyclopedia web page, available at http://en.wikipedia.org/wiki/Ultrafiltration, printed on Oct. 22, 2008, p. 1.
"Ultrafiltration", ultrafiltration: Definition from Answers.com website, available at http://www.answers.com/topic/ultrafiltration, printed on Oct. 20, 2008, p. 1.
Vortex™ Water Systems, LLC., Brochure/Advertisement, pp. 1-6, after Dec. 1995.
"Water purification", Water purification—Wikipedia, the free encyclopedia web page, last modified Oct. 20, 2008, available at http://en.wikipedia.org/wiki/Water_purificatin, printed on Oct. 22, 2008, pp. 1-5.
Author Unknown, "Electrocoagulation Systems", pp. 1-9, dated unknown.
Barkley, et al., "Emerging Technology Summary—Electro-Pure Alternating Current Electrocoagulation", Superfund Innovative Technology Evaluation, Sep. 1993, EPA/640/S-937507, pp. 1-5.
Baumgarten, et al., "Reduction of the Nitrogen and Carbon Content in Swine Waste with Algae and Bacteria", Appl. Microbiol Biotechnol, Aug. 1999, 52(2), pp. 281-284 (Abstract only).
Chan, et al., "Microalgae as Bioabsorbents for Treating Mixture of Electroplating and Sewage Effluent", Biomed Environ Sci, Sep. 1991, 4(3), pp. 250-261 (Abstract only).
Chrost, et al., "Degradation of Urea by Bacteria and Algae in Mass Algal Cultures", Acta Microbiol Pol B, 1975, 7(4), pp. 231-236 (Abstract Only).
Fletcher, et al., "Industrial Electrochemistry", Second Edition, Chapman-Hall, 1990, Great Britain, pp. 337-338 and 560-561.
Grigg, AWWA Trade Waste Interest Group and Institute for Sustainable Futures—Joint Seminar, Presentation of Paper, Sep. 14-15, 1999, pp. 1-6.
Hammouda, et al., "Microalgae and Wastewater Treatment", Ecotoxicol Environ Saf, Aug. 1995, 31(3), pp. 205-210 (Abstract Only).
Holt, et al., "Electrocoagulation: A Technology-Oriented Review", Department of Chemical Engineering, University of Sydney, 2006, pp. 1-61.
Horn, "Informational Memorandum for the Deputy Secretary of Agriculture of the U.S. Re: Electrocoagulation", Dec. 11, 1995, pp. 1-4.
Matusiak, et al., "Studies on the Purification of Wastes from the Nitrogen Fertilizer Industry by Intensive Algal Cultures. IV. Growth of Chlorella Vulgaris in Wastes with High Nitrogen Content in Intensive Algal Cultures. I. Growth of Chlorella Vulgaris in Wastes", Acta Microbiol Pol, 1976, 25(3), pp. 233-242 (Abstract Only).
Miernik, "The Quality of Protein from Algae Used in the Purification of Wastewater from the Nitrogen Fertilizer Industry", Acta Microbiol Pol, 1983, 32(3), pp. 269-274 (Abstract Only).
Miner, et al., "Managing Livestock Wastes to Preserve Environmental Quality", Iowa State University Press., 2000, pp. 1-318.
Powell, "Electrocoagulation—A Technical Analysis", on behalf of Vortex™ Water Systems, LLC., 1995, pp. 1-25.
Powell, "Water Reuse Eliminates Government Required Treatments for Wastewater Discharges", Clean Tech 2003 Proceedings, 10th Annual International Cleaning Technology Exposition, Mar. 2003, pp. 270-272.
Smith, "Applications of New Concepts of Physical-Chemical Wastewater Treatment", Progress in Water Technology, vol. 1, Pergamon Press, edited by W.W. Eckenfelder, et al., paper presented at Vanderbuilt University, sponsored by the International Association on Water Pollutin Research & the American Institute of Chemical Engineers, Sep. 18-22, 1972, pp. 1-10.
Woytowich, et al., "Electrocoagualtion (CURE) Treatment of Ship Bilgewater for the U.S. Coast Guard in Alaska", MTS Journal, vol. 27, No. 1, Spring 1993, pp. 62-67.
Smith, "Birth of "ELECHEM" System", Progress in Water Technology, vol. 1, Pergamon Press, Vanderbilt University—Sep. 18-22, 1972, 10 pages.

* cited by examiner

STRUVITE FORMATION BY PRECIPITATION OF AMMONIA IN ELECTROCOAGULATION PROCESS

CROSS-REFERENCE TO RELATED APPLICATIONS

This application is a continuation-in-part of U.S. patent application Ser. No. 13/774,956, filed 22 Feb. 2013.

FIELD OF THE INVENTION

The invention relates to systems and methods for electrocoagulation treatment of wastewater, and in particular to systems and methods resulting in struvite formation and the precipitation of ammonia, nitrates, nitrites, and urea.

BACKGROUND OF THE PRESENT INVENTION

Electrocoagulation is the process of destabilizing suspended, emulsified, or dissolved contaminants in an aqueous medium by introducing an electrical current into the medium. The electrical current provides an electromotive force to drive the contaminants out of suspension, emulsion, or solution and produce solids. The contaminant solids form hydrophobic entities that precipitate and are easily removed by any number of secondary separation techniques, such as, by way of non-limiting example, electrolytic flotation to remove coalesced colloidal materials.

Electrocoagulation systems are capable of removing a diverse array of contaminants, including, by way of non-limiting example, paper pulp mill waste, metal plating waste, tannery waste, cannery waste, steel mill effluent, slaughterhouse waste, chromates, lead species, mercury species, and domestic sewage. The wastewaters containing these and other contaminants are generally reduced to water that is substantially clear, clean, and odorless, and thus capable of reuse in various applications.

However, previous electrocoagulation water treatment systems are not capable of removing certain contaminants to below safe or legal limits from certain input streams. One contaminant in particular that is difficult to remove by electrocoagulation is ammonia and related species, which may make up a substantial proportion of the contaminants in, by way of non-limiting example, municipal sewage streams. Although some attempts have been made to provide for electrocoagulation systems that remove ammonia, these have typically suffered from a number of drawbacks. For example, U.S. Patent Application Publication 2014/0021057, published 23 Jan. 2014 to Berrak ("Berrak"), discloses electrocoagulation methods for the removal of ammonia, but the methods of Berrak are not capable of providing treated streams with ammonia contents lower than about 13 mg/L and require a relatively narrow pH range for the input stream. As a result, prior art water treatment systems utilizing electrocoagulation must be provided in conjunction with one or both of pretreatment (to provide an appropriate input pH) or posttreatment (to further remove ammonia) by other methods to provide treated streams with acceptable ammonia content.

Another general contaminant of concern includes certain nitrogen compounds. Increased levels of nitrates are a potential health hazard for drinking water when ammonia fertilizer is applied to farmland. Centrate from municipal sewer plants are a major loading source for nitrogen contaminants when the centrate is returned to the front of the plant for further processing. Achieving nitrogen compliance levels is becoming more difficult for sewage plants as governmental regulations limits are lowered.

There is thus a need in the art to provide efficient systems for treating aqueous wastes by electrocoagulation that reduce an ammonia content of the aqueous waste to acceptable levels, and that are capable of operation over a wide range of input pH. There is also a need to remove sufficient levels of nitrogen contaminants.

SUMMARY OF THE INVENTION

This invention provides methods of reducing a concentration of at least one ammonia-related species in an aqueous medium. In one preferred embodiment, the method comprises the steps of a) providing a housing including a lower portion defining a reaction chamber, a base, and an upper portion defining a development chamber; b) arranging a plurality of reaction plates within the reaction chamber, the plates being vertically disposed in the reaction chamber and spaced apart from one another to create gaps between adjacent reaction plates; c) providing at least two reaction plate tabs connected to selected ones of the plurality of reaction plates, the reaction plate tabs extending through the lower portion of the housing; d) applying a DC voltage to the at least two reaction plate tabs to create at least one electric field within the reaction chamber; e) passing a stream of the aqueous medium vertically through the reaction chamber in the gaps between reaction plates; f) adding a quantity of a magnesium, calcium, or other alkali earth metals, species and a quantity of a phosphate species to the aqueous medium, such that a magnesium concentration and a phosphate concentration are each stoichiometrically equivalent to a concentration of the at least one ammonia-related species; and g) conducting electrocoagulation of the aqueous medium, the electrocoagulation providing an energy of activation of a reaction between the magnesium species, the phosphate species, and the at least one ammonia-related species to form a struvite precipitate, whereby the concentration of the at least one ammonia-related species in the aqueous medium after step g) is less than about 0.6 mg/L. Alternatively, the concentration of the at least one ammonia-related species in the aqueous medium after step g) is at least as low as about 5.9 mg/L and as low as about 0.06 mg/L.

According to another embodiment of the invention, the method also results in precipitation of nitrogen compounds including nitrates, nitrites, and urea. Nitrogen compounds can be precipitated from a stream by electrocoagulation with sufficient residence time in the reaction chamber in which the reduction of nitrogen can be reduced to nearly any desired level. These residence times may greatly vary, for example, between about ten seconds and ten minutes. However, after a period of time, such as approximately ten days, the treated stream will experience return of the concentration of nitrate compounds up to about one half of the original concentration. During this time period after treatment a portion of the nitrate may be converted to ammonia and the ammonia subsequently returns to a nitrate form. When the nitrogen is converted to struvite, there are no ammonia or nitrate ions remaining in the water. If a molar ratio of nitrogen, phosphate, and magnesium or calcium is added, and then electrocoagulation is conducted, then nitrate removal is not reversible over time. More specifically, production of insoluble struvite requires the combination of one mole of nitrogen, phosphate, and calcium or magnesium. The amount of inorganic nitrogen in the water is removed by adding an excess of phosphate and magnesium or calcium to the water. The mixed stream is then subjected to electrocoagulation, which drives the reaction of the nitrogen, phosphate, and magnesium ions into insoluble struvite.

According to another aspect of the invention, the reaction plates may be consumable and, in step g), give up ions whereby the reaction plates may be consumed over time, and wherein the ammonia-related species may further react with the ions given up by the reaction plates.

According to yet another aspect of the invention, the concentration of the at least one ammonia-related species in the aqueous medium may be less than about 0.06 mg/L after step g).

According to yet another aspect of the invention, the method may be carried out in the substantial absence of pH adjustment.

According to yet another aspect of the invention, a pH of the aqueous medium, during step g), may be less than 7.

According to yet another aspect of the invention, the at least one ammonia-related species may comprise at least one selected from the group consisting of ammonia, ammonium species, and urea.

According to yet another aspect of the invention, the method may further comprise applying a vacuum to the reaction chamber to remove at least one of foam and volatilized compounds.

According to yet another aspect of the invention, the method may further comprise filtering the stream prior to step e).

According to yet another aspect of the invention, the method may further comprise pumping the stream through the reaction chamber.

According to yet another aspect of the invention, the method may further comprise isolating the reaction chamber from atmospheric pressure to maintain a desired pressure within the chamber.

According to yet another aspect of the invention, the method may further comprise removing spent reaction plates from the reaction chamber and replacing the spent reaction plates with new reaction plates.

According to yet another aspect of the invention, at least one of the magnesium species and the phosphate species may be added to the aqueous medium via a venturi.

According to yet another aspect of the invention, step d) may comprise the sub-steps of d1) receiving a constant AC line voltage; and d2) rectifying the AC line voltage to the DC voltage. The at least one electric field may comprise a first electric field and a second electric field, the first electric field existing between a first plurality of reaction plates and having a first voltage and a first amperage, the second electric field existing between a second plurality of reaction plates and having a second voltage and a second amperage, wherein the first and second voltages may be different and the first and second amperages may be different.

According to yet another aspect of the invention, the method may further comprise, after step g), flowing the aqueous medium into a settling vessel, wherein at least one of the struvite precipitate and an electrocoagulated contaminant settles out of the aqueous medium.

According to yet another aspect of the invention, the method may further comprise venting gases created in step g) to the top of the reaction chamber by buoyancy.

According to another aspect of the invention, it may be considered a system for reducing a concentration of at least one ammonia-related species in an aqueous medium, comprising: a housing including a lower portion defining a reaction chamber, a base, and upper portion defining a development chamber; a plurality of reaction plates arranged within the reaction chamber, the plates being vertically disposed in the reaction chamber and spaced apart from one another to create gaps between adjacent reaction plates; at least two reaction plate tabs connected to selected ones of the plurality of reaction plates, the reaction plate tabs extending through the lower portion of the housing; a DC voltage applied to the at least two reaction plate tabs to create at least one electric field within the reaction chamber; a stream of an aqueous medium passed vertically through the reaction chamber in the gaps between reaction plates; a quantity of a magnesium species and a quantity of a phosphate species added to the aqueous medium, such that a magnesium concentration and a phosphate concentration are each stoichiometrically equivalent to a concentration of the at least one ammonia-related species; and wherein electrocoagulation of the aqueous medium is conducted, the electrocoagulation providing an energy of activation of a reaction between the magnesium species, the phosphate species, and the at least one ammonia-related species to form a struvite precipitate, and wherein a concentration of the at least one ammonia-related species in the aqueous medium after electrocoagulation is less than about 0.6 mg/L or wherein the concentration of the at least one ammonia-related species in the aqueous medium after electrocoagulation is at least as low as about 5.9 mg/L and as low as about 0.06 mg/L.

According to yet another aspect of the invention, it may be considered a system for reducing a concentration of at least one ammonia-related species in an aqueous medium, comprising:

a) an electrocoagulation unit comprising: a housing including a lower portion defining a reaction chamber, a base, and an upper portion defining a development chamber; a plurality of reaction plates arranged within the reaction chamber, the plates being vertically disposed in the reaction chamber and spaced apart from one another to create gaps between adjacent reaction plates; at least two reaction plate tabs connected to selected ones of the plurality of reaction plates, the reaction plate tabs extending through the lower portion of the housing; a DC voltage applied to the at least two reaction plate tabs to create at least one electric field within the reaction chamber; a stream of an aqueous medium passed vertically through the reaction chamber in the gaps between reaction plates; a quantity of a magnesium species and a quantity of a phosphate species added to the aqueous medium, such that a magnesium concentration and a phosphate concentration are each stoichiometrically equivalent to a concentration of the at least one ammonia-related species, wherein electrocoagulation of the aqueous medium is conducted, the electrocoagulation providing an energy of activation of a reaction between the magnesium species, the phosphate species, and the at least one ammonia-related species to form a struvite precipitate, and wherein a concentration of the at least one ammonia-related species in the aqueous medium after electrocoagulation is less than about 0.6 mg/L or wherein the concentration of the at least one ammonia-related species in the aqueous medium after electrocoagulation is at least as low as about 5.9 mg/L and as low as about 0.06 mg/L;

b) a base tank containing a base of a sufficient concentration to drive formation of struvite;

c) an acid tank containing an acid with a stoichiometric balance with the base to drive the formation of the struvite, said base tank and acid tank having a line communicating with the electrocoagulation unit to deliver a selected and metered amount of the base and acid to the aqueous medium;

d) at least one clarification tank communicating with a treated outflow of the aqueous medium from the electrocoagulation unit in which the at least one ammonia-related species ammonia has been precipitated; and a drying bed for receiving sludge exiting the at least one clarification.

According yet another aspect of the invention, it may further include reversing a polarity of the applied DC voltage. Further, the polarity can be reversed within about one minute time periods.

These and other aspects and features of the invention are described in further detail in connection with the drawings, detailed description, and claims that follow.

DETAILED DESCRIPTION OF THE INVENTION

The present invention relates to methods and systems for the remediation of wastewater by electrocoagulation.

As used herein, the term "ammonia-related species" refers to ammonia and any chemical compound derived from ammonia by natural or synthetic processes, including but not limited to nitrogen hydrides and cations, anions, and ligands derived therefrom. By way of non-limiting example, ammonia-related species include ammonia, ammonium hydroxide, ammonium salts, urea, and the like.

The electrocoagulation unit may be any suitable unit. By way of non-limiting example, suitable electrocoagulation units have been described in U.S. Pat. No. 6,139,710, issued 31 Oct. 2000 to Powell ("Powell I"), and U.S. Pat. No. 8,048,279, issued 1 Nov. 2011 to Powell et al. ("Powell II"), the entireties of both of which are incorporated herein by reference. The electrocoagulation unit of the wastewater treatment system may further include at least one clarification tank and a clean fluid tank. The clarification tank may comprise an inner separation cylinder and an outer cylinder. The electrocoagulation unit may further comprise a sludge collection pit and a sludge drying pit.

The wastewater treatment system may include an electrocoagulation tank cleaning system. The electrocoagulation tank cleaning system cleans the electrocoagulation tank as required and may be automatically activated or may be activated manually. The electrocoagulation tank cleaning system may comprise at least one clean fluid tank, a clean fluid supply for supplying clean fluid from the fluid water tank to the electrocoagulation unit, and a used fluid tube for providing used fluids from the electrocoagulation unit. The electrocoagulation cleaning system may provide cleaning fluids to the electrocoagulation tank to clean the tanks. Cleaning fluids may include any acids such as sulfuric acid, hydrochloric acid, phosphoric acid, acetic acid, and any combination thereof. Cleaning fluids may also include bases such as sodium hydroxide, potassium hydroxide, and the like. The electrocoagulation tank cleaning system may further comprise at least one pump for supplying the clean fluid to the electrocoagulation unit. In some embodiments, the electrocoagulation tank cleaning system may further include at least one tank drain line for removing the cleaning fluid from the clean fluid tank.

The wastewater treatment system may further comprise at least one acid supply tank and/or at least one base supply tank. The acid supply tank may hold an acid and the base supply tank may hold a base and are capable of supplying an acid and/or a base to the electrocoagulation tank to regulate the pH of the electrocoagulation unit. The acid may be selected from the group consisting of phosphoric acid, sulfuric acid, acetic acid and combinations thereof. The base may be selected from the group consisting of magnesium hydroxide, potassium hydroxide, calcium hydroxide and combinations thereof. The concentration of the cleaning solution may vary. In some embodiments, between about 10% and about 15% sulfuric acid may be used.

The wastewater treatment system of the present invention may also include at least one sludge tank and at least one drying bed. The drying bed receives sludge from the electrocoagulation unit and the sludge may be dried in the drying bed.

The wastewater treatment system may further include at least one purification fluid tank. The fluid removed from the sludge tank may be directed to the purified fluid tank. The purified fluid in the purified fluid tank may be supplied to the electrocoagulation unit. The purified fluid may also be supplied to a clean fluid tank.

The electrocoagulation unit may be used to reduce at least one contaminant in the wastewater. The secondary contaminant may be selected from the group consisting of organics, inorganics, pharmaceuticals, bacteria, viruses, fecal coliforms, phosphates, nitrates, metals, radioactive materials, and combinations thereof. The residence time in the electrocoagulation unit may vary. In some embodiments, the residence time in the electrocoagulation unit is between about 1 second and about 2 days. In some embodiments, the residence time in the electrocoagulation unit is between about 10 seconds and about 3 minutes, between about 1 minute and about 10 minutes, or about 1 minute. The operating temperature of the electrocoagulation unit may be any suitable temperature such that the waters being processed in the electrocoagulation unit are liquid. In some embodiments, the operating temperature is between about 0° C. and about 100° C.

Figure 1:
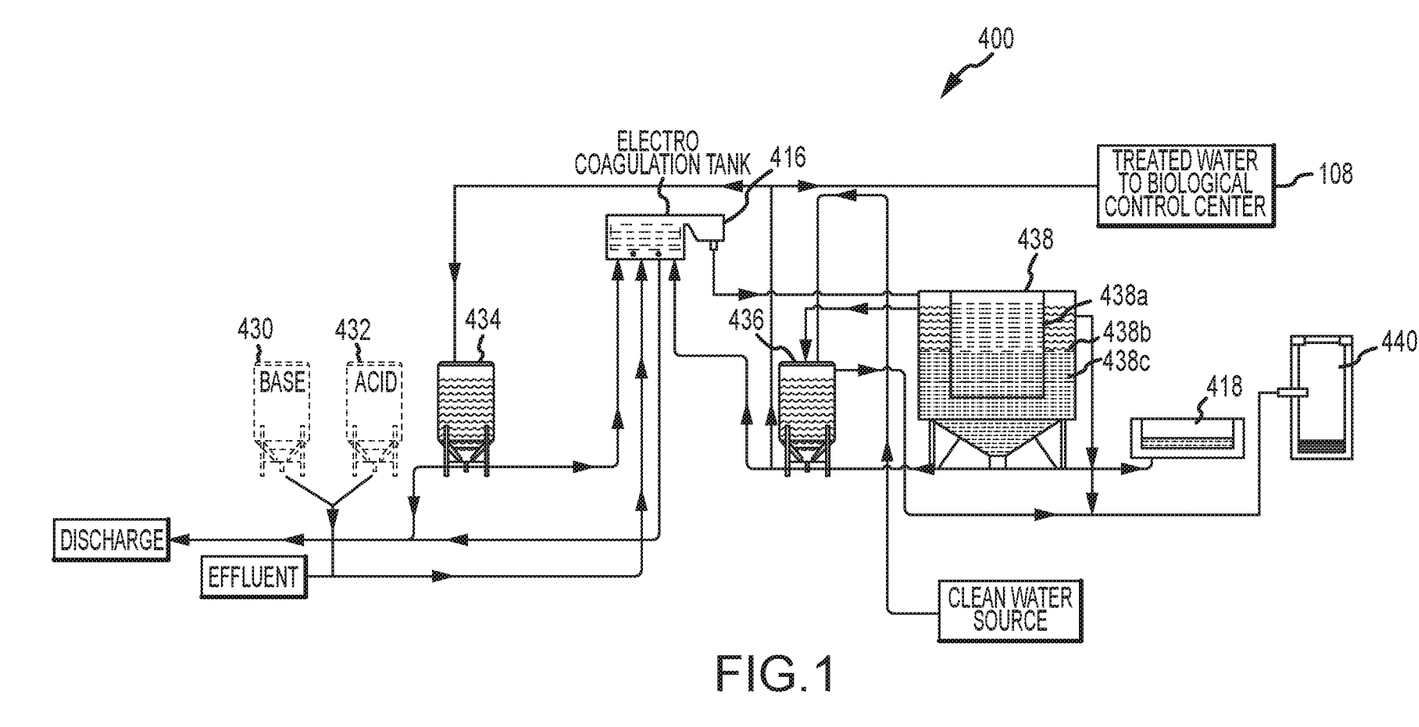
FIG. 1 illustrates a system in a preferred embodiment of the present invention.

FIG. 1 illustrates a system 400 of the invention. Effluent fluid is provided to the electrocoagulation unit 416. The system 400 may comprise a base tank 430, which may contain any base in a sufficient concentration to drive formation of struvite (magnesium ammonium phosphate, $NH_4MgPO_4 \cdot 6H_2O$). The concentration of the base may be between about 0.1M and about 10M. The base may be selected from the group consisting of $Mg(OH)_2$, KOH, Ca(OH)$_2$, and combinations thereof. The base may be provided in stoichiometric excess to drive the struvite formation to completion. The system 400 may also comprise an acid tank 432, which may contain about between about 75% and about 99% of an acid, including about 95% of an acid, such as H$_3$PO$_4$. The acid may be provided in a stoichiometric balance with the base to drive the struvite production. The amount of ammonia may be measured to determine the amount of acid and base required. The acid and base may be mixed to adjust the pH and may be provided to the electrocoagulation unit 416 at an appropriate pH. The electrocoagulation may work particularly well over a pH range of between about 4 and about 12; however, electrocoagulation has been found to be effective over broader ranges of pH. When struvite is being produced, the pH may be at a range of between about 1 and about 10, including a pH of about 7-8.

Valves may be used to eliminate the acid or base flow to the electrocoagulation unit 416. The system 400 may be equipped with valves and pumps throughout the system 400 to control and direct the flow of fluids within the system 400.

The system 400 may also comprise an optional in-place cleaning system. The system 400 may comprise a clean fluid holding tank 434, which may provide a cleaning solution to the electrocoagulation unit 416 to clean the electrocoagulation unit. The clean fluid holding tank 434 may contain a cleaning solution which is between about 10% and about 15% of base and any concentration of an acid. By way of example, the cleaning solution may be the same acid provided for use in struvite production and may be provided from acid tank 432. In some embodiments, the acid may be about 10% to about 15% sulfuric acid. It is understood that any suitable acid or combination thereof may be used. In some embodiments, the acid may be hydrochloric and/or acetic acid. The cleaning solution may be used over and over until the cleaning solution is spent (i.e., worn out, or no longer functional to clean). When the cleaning solution is spent, it may be placed in the electrocoagulation feed tank for disposal through the electrocoagulation process.

Disinfected and purified water may be held in storage tank 436. Water may be provided to the storage tank 436 from any clean water source, including sources outside of the system 400, such as city or potable water. The disinfected and purified water may be provided to the electrocoagulation unit 416 and/or may be provided to the clean fluid holding tank 434. The electrocoagulation process floods the water with electrons, causing bacteria, viruses, algae, and other living organisms to lyse. In the presence of sodium chloride, the electrocoagulation process may produce sodium hypochlorite or bleach.

Fluid exiting the outflow portion of the electrocoagulation unit 416 may be provided to one or more clarification tanks 438. The clarification tank 438 may be any suitable clarifier. In some embodiments, the clarification tank 438 may be a settling pond, a decant tank, a filtration tank, or the like. In some embodiments, the clarification tank 438 may further comprise a rake or a sonic vibrator to move sludge within the clarification tank 438. In some embodiments, the clarification tank 438 may comprise several sections including the inner and outer separation cylinder 438a, the upper sludge 438b and the lower sludge 438c. Fluid in the inner and outer separation cylinder 438a is disinfected and purified water may be provided to the storage tank 436, the sewage line 440, or the drying bed 418, and/or may be discharge from the system 400. In some embodiments, discharge from the system 400 may be recycled to the inlet of the electrocoagulation system 400. By way of example, the disinfected and purified water may be discharged to a sewage line 440 (which may be above or below ground level). The disinfected and purified water is on the topmost portion of the clarification tank 438 and is above the upper sludge limit 438b. As would be understood by one skilled in the art, the upper sludge limit 438b and lower sludge limit 438c may vary in the clarification tank 438. In some embodiments, the upper sludge limit 438b and the lower sludge limit 438c may be used to filter solids through a sludge blanket. In some embodiments, a small amount of sludge should remain in the clarification tank 438. The outlet for the disinfected and purified water may be located at any suitable location on the clarification tank 438. Sludge remaining in the clarification tank 438 may be directed to a drying bed 418. The drying bed 418 may be located underground or may be above ground.

Figure 2:
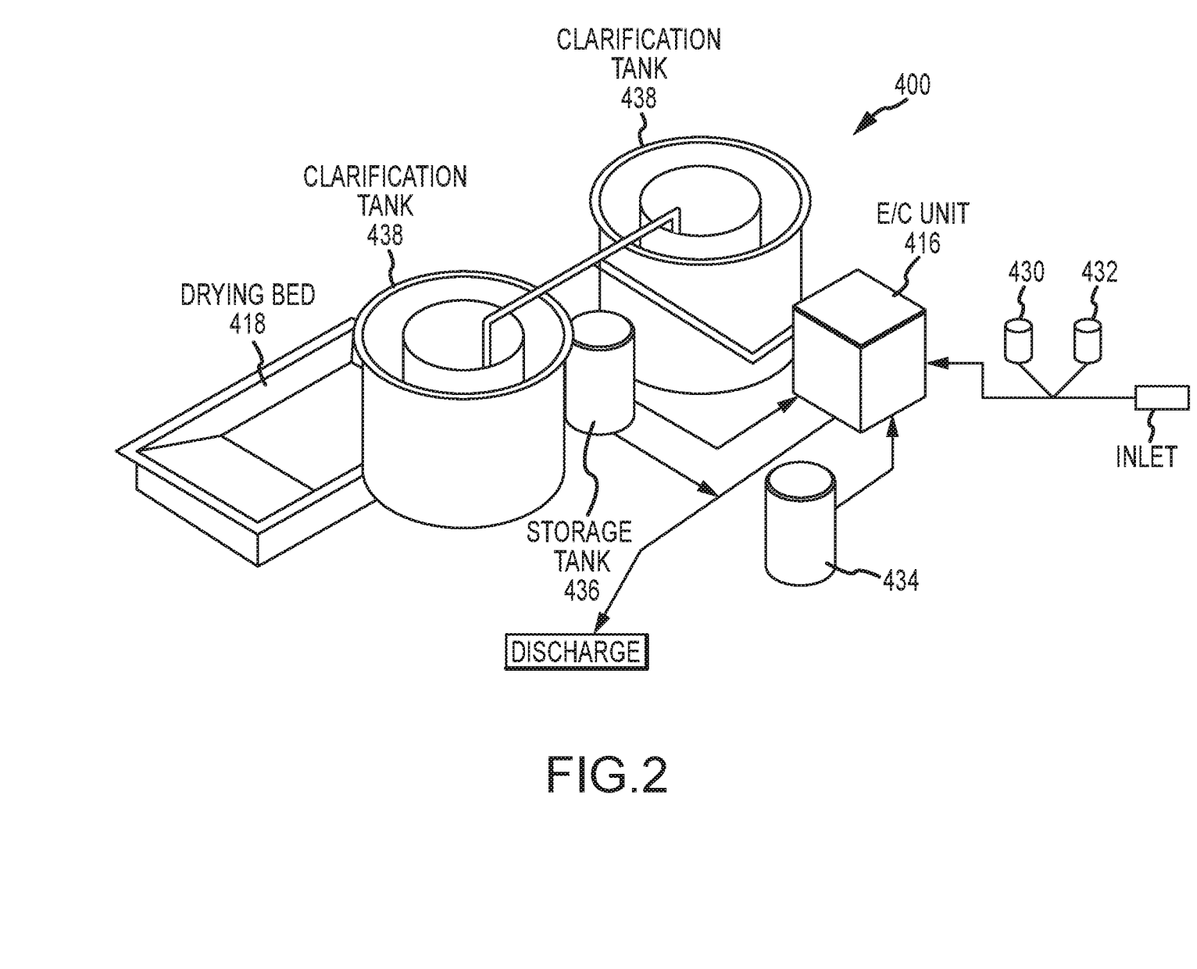
FIG. 2 illustrates an isometric view of an electrocoagulation system with certain components.

FIG. 2 illustrates an isometric view of the system 400 with certain components. FIG. 2 illustrates the inner and outer separation cylinder of two clarification tanks 438. It is understood that though two clarification tanks 438 are illustrated in FIG. 2, any number of clarification tanks 438 may be used without deviating from the invention. The electrocoagulation unit 416 is connected to the clarification tanks 438 with distribution lines. The clean fluid holding tank 434 may provide cleaning fluid to the electrocoagulation unit 416. The system 400 may also comprise an acid tank 432 and/or a base tank 430 for struvite production. In some embodiments, the fluid in the clean fluid holding tank 434 may be used in the acid tank 432. Purified water supply from the storage tank 436 may also be provided to the electrocoagulation unit 416. Sludge exiting the clarification tanks 438 may be directed to the drying bed 418.

Colloidal clays, bacteria, viruses, suspended solids, dissolved solids, metal oxides, hydrocarbons, and the like may be removed with the electrocoagulation unit.

Table 1 illustrates examples of different contaminants that may be removed using the electrocoagulation unit without addition of magnesium or phosphate species. Table 1 illustrates the amount of a contaminant present in a water sample prior to use in an electrocoagulation unit, the concentration after processing in the electrocoagulation unit, and the removal rate.

TABLE 1

| CONTAMINANT | BEFORE (mg/L) | AFTER (mg/L) | REMOVAL RATE (%) |
|---|---|---|---|
| Aldrin (pesticide) | 0.0630 | 0.0010 | 98.40 |
| Aluminum | 224.0000 | 0.6900 | 99.69 |
| Ammonia | 49.0000 | 19.4000 | 60.41 |
| Arsenic | 0.0760 | <0.0022 | 97.12 |
| Barium | 0.0145 | <0.0010 | 93.10 |
| Benzene | 90.1000 | 0.3590 | 99.60 |
| BOD | 1050.0000 | 14.0000 | 98.67 |
| Boron | 4.8600 | 1.4100 | 70.98 |
| Cadmium | 0.1252 | <0.0040 | 96.81 |
| Calcium | 1,321.0000 | 21.4000 | 98.40 |
| Chlorieviphos (pesticide) | 5.8700 | 0.0300 | 99.50 |
| Chromium | 139.0000 | <0.1000 | 99.92 |
| Cobalt | 0.1238 | 0.0214 | 82.71 |
| Copper | 0.7984 | <0.0020 | 99.75 |
| Cyanide (Free) | 723.0000 | <0.0200 | 99.99 |
| Cypermethrin (pesticide) | 1.3000 | 0.0700 | 94.60 |
| DDT (pesticide) | 0.2610 | 0.0020 | 99.20 |
| Diazinon (pesticide) | 34.0000 | 0.2100 | 99.40 |

TABLE 1-continued

| CONTAMINANT | BEFORE (mg/L) | AFTER (mg/L) | REMOVAL RATE (%) |
|---|---|---|---|
| Ethyl Benzene | 428.0000 | 0.3720 | 99.91 |
| Fluoride | 1.1000 | 0.4150 | 62.27 |
| Gold | 5.7200 | 1.3800 | 75.87 |
| Iron | 68.3400 | 0.1939 | 99.72 |
| Lead | 0.5900 | 0.0032 | 99.46 |
| Lindane (pesticide) | 0.1430 | 0.0010 | 99.30 |
| Magnesium | 13.1500 | 0.0444 | 99.66 |
| Manganese | 1.0610 | 0.0184 | 98.27 |
| Mercury | 0.7200 | <0.0031 | 98.45 |
| Molybdenum | 0.3500 | 0.0290 | 91.71 |
| MP-Xylene | 41.6000 | 0.0570 | 99.86 |
| MTBE | 21.5800 | 0.0462 | 99.79 |
| Nickel | 183.0000 | 0.0700 | 99.96 |
| Nitrate | 11.7000 | 2.6000 | 77.78 |
| Nitrite | 21.0000 | 12.0000 | 42.86 |
| Nitrogen TKN | 1,118.8800 | 59.0800 | 94.72 |
| NTU | 35.3800 | 0.3200 | 99.10 |
| O-Xylene | 191.0000 | 0.4160 | 99.78 |
| PCB (Arochlor 1248) | 0.0007 | <0.0001 | 85.71 |
| Petroleum Hydrocarbons | 72.5000 | <0.2000 | 99.72 |
| Phosphate | 28.0000 | 0.2000 | 99.28 |
| Platinum | 4.4000 | 0.6800 | 84.55 |
| Potassium | 200.0000 | 110.0000 | 45.00 |
| Proptamphos (pesticide) | 80.8700 | 0.3600 | 99.60 |
| Selenium | 68.0000 | 38.0000 | 44.00 |
| Silicon | 21.0700 | 0.1000 | 99.50 |
| Sulfate | 104.0000 | 68.0000 | 34.61 |
| Silver | 0.0081 | 0.0006 | 92.59 |
| Tin | 0.2130 | <0.0200 | 90.61 |
| Toluene | 28,480.0000 | 0.2270 | 99.99 |
| TSS | 1,560.0000 | 8.0000 | 99.49 |
| Vanadium | 0.2621 | <0.0020 | 99.24 |
| Zinc | 221.00 | 0.14 | 99.90 |
| Americium-241 | 71.9900 pCi/L | 0.5700 pCi/L | 99.20 |
| Plutonium-239 | 29.8500 pCi/L | 0.2900 pCi/L | 99.00 |
| Radium | 1093.0000 pCi/L | 0.1000 pCi/L | 99.99 |
| Uranium | 0.1300 mg/L | 0.0002 mg/L | 99.83 |
| Bacteria | 110,000,000.00 cfu | 2,700.00 cfu | 99.99 |
| Coliform | 318,000,000.00 cfu | <1.00 cfu | 99.99 |
| E coli Bacteria | >2,419.20 mpn | 0.00 mpn | 99.99 |
| Enterococcus Bacteria | 83.00 mpn | <10.00 mpn | 82.87 |
| Total Coliform Bacteria | >2,419.20 mpn | 0.00 mpn | 99.99 |

As shown in Table 1, one of the few contaminants not effectively removed by previous electrocoagulation units is ammonia. This drawback is addressed by the electrocoagulation units and processes of the present disclosure, which remove ammonia from aqueous streams by reacting the ammonia and like species to form a struvite precipitate.

Figure 3:
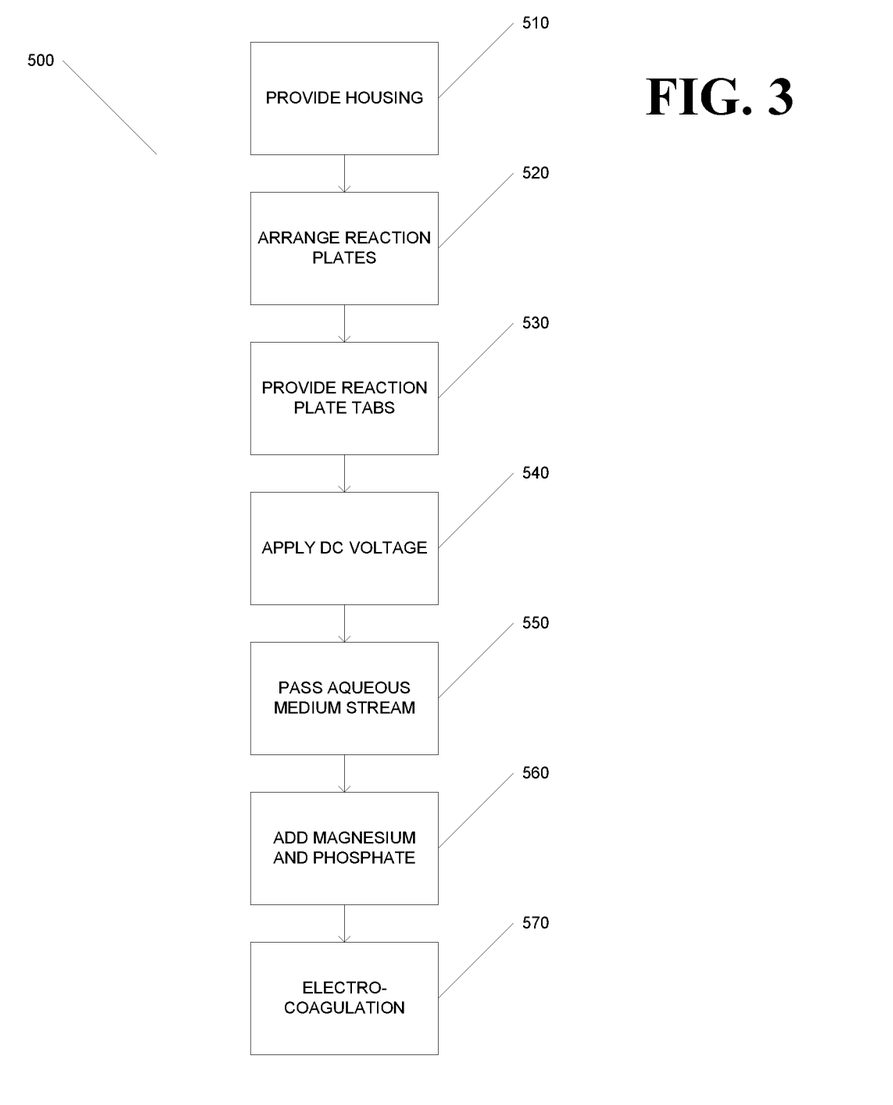
FIG. 3 illustrates an electrocoagulation method according to the present invention.

FIG. 3 illustrates a method 500 for reducing a concentration of at least one ammonia-related species in an aqueous medium. In first providing step 510, a housing including a lower portion defining a reaction chamber, a base, and an upper portion defining a development chamber is provided. In arranging step 520, a plurality of reaction plates are arranged within the reaction chamber, the plates being vertically disposed in the reaction chamber and spaced apart from one another to create gaps between adjacent reaction plates. In second providing step 530, at least two reaction plate tabs connected to selected ones of the plurality of reaction plates are provided, the reaction plate tabs extending through the lower portion of the housing. In applying step 540, a DC voltage is applied to the at least two reaction plate tabs to create at least one electric field within the reaction chamber. In passing step 550, a stream of the aqueous medium is passed vertically through the reaction chamber in the gaps between reaction plates. In adding step 560, a quantity of a magnesium species and a quantity of a phosphate species are added to the aqueous medium, such that a magnesium concentration and a phosphate concentration are each stoichiometrically equivalent to the concentration of the at least one ammonia-related species. In conducting step 570, electrocoagulation of the aqueous medium is conducted, the electrocoagulation providing an energy of activation of a reaction between the magnesium species, the phosphate species, and the at least one ammonia-related species to form a struvite precipitate. In the method 500, the concentration of the at least one ammonia-related species in the aqueous medium after conducting step 570 is at least as low as about 5.9 mg/L and as low as about 0.06 mg/L. Alternatively, the concentration of the at least one ammonia-related species in the aqueous medium after conducting step 570 is less than about 0.6 mg/L. Additional steps and/or variations on the steps described above will be apparent to those of ordinary skill in art in light of this disclosure.

In previous systems and methods for the treatment of sewage and other waste waters, struvite has generally been considered an undesirable byproduct because it may form a scale on lines or belts or in centrifuges or pumps, or may clog pipes or other equipment. However, methods according to the present disclosure deliberately drive the formation of struvite such that it precipitates out of the aqueous medium. Although the struvite itself has value, e.g. as a source of nitrogen and other nutrients for recycle as fertilizer, one advantage of the present invention is that it utilizes the formation of struvite as a means of removing ammonia from the aqueous medium being treated. Particularly, it has been recognized by the present inventor that the electrocoagulation process may provide the necessary energy of activation for a chemical reaction that forms struvite from ammonium ions in the aqueous medium and added magnesium and phosphate ions.

The method 500 illustrated in FIG. 3 removes ammonia from waste waters and other aqueous media much more efficiently than electrocoagulation or chemical precipitation processes according to the prior art. The method 500 is capable of removing ammonia-related species from waste waters to levels at least as low as about 5.9 mg/L and as low as about 0.06 mg/L, i.e. about 99.5% lower than the 13 mg/L achieved by the methods of Berrak. Moreover, unlike prior art methods that generally require pH to be within a narrow, alkaline range, e.g. pH between about 7 and about 9.5, the method 500 is applicable over a wide pH range and effectively removes ammonia-related species under acidic (pH<7) as well as alkaline conditions. Although ammonia itself is often the contaminant of interest, other ammonia-related species, including ammonium salts and urea, are effectively removed by the method 500.

Figure 4:
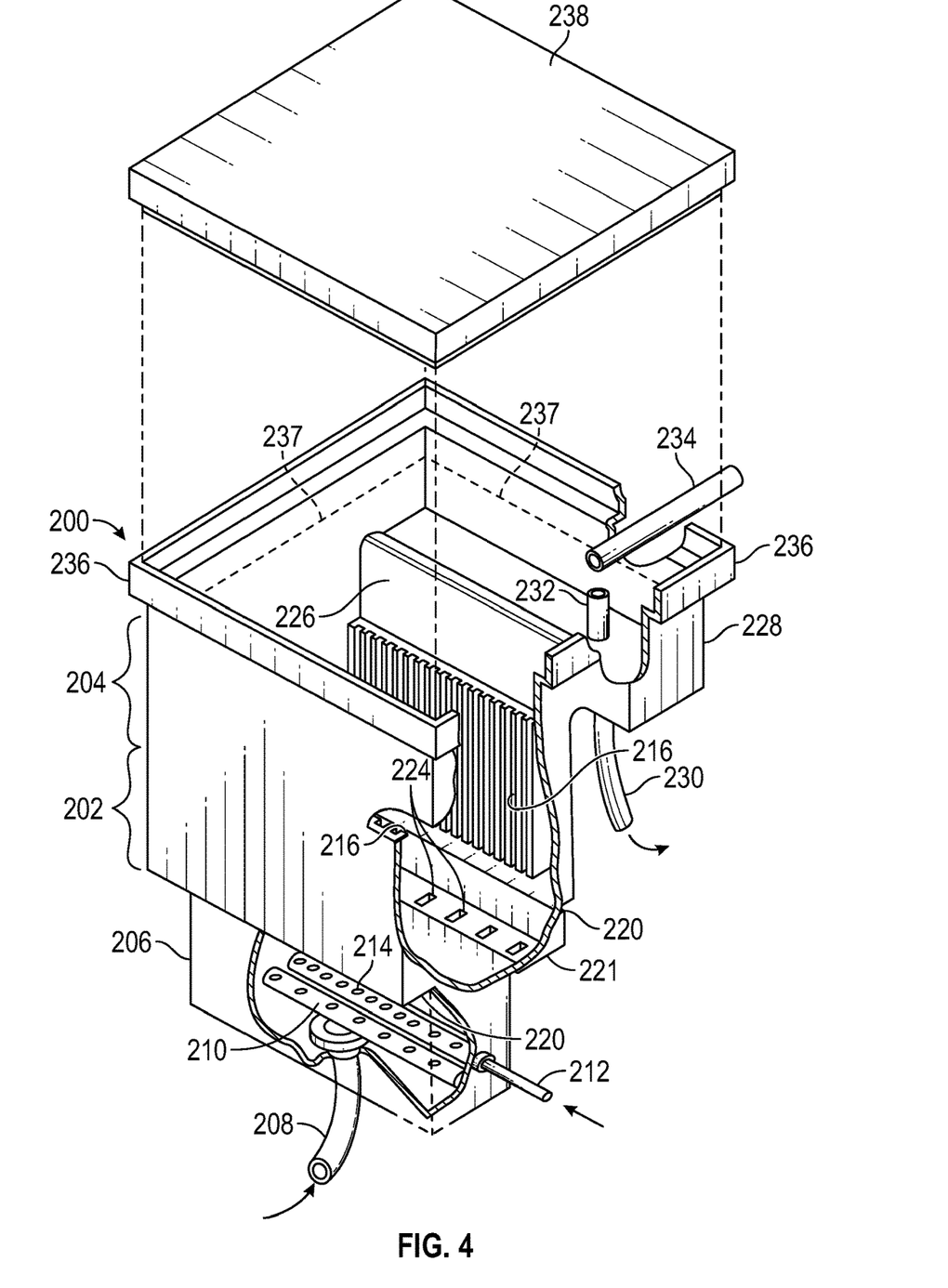
FIG. 4 is a fragmentary perspective view of an exemplary electrocoagulation unit broken away to better illustrate the features therein.
Figure 5:
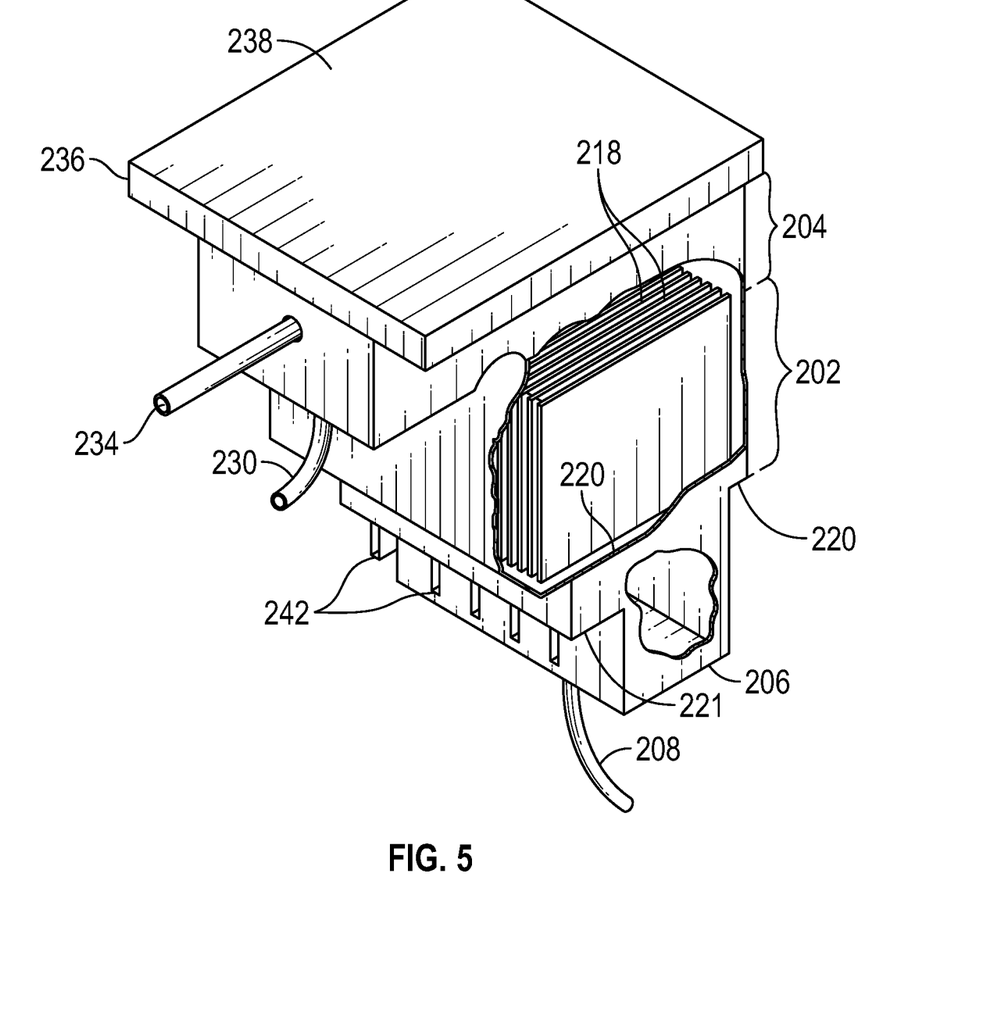
FIG. 5 is another fragmentary perspective view similar to FIG. 4 but illustrating the device in a reversed position, and further illustrating a plurality of reaction plates positioned with the reaction chamber and the top cover placed over the device

Referring to FIGS. 4-7, an exemplary electrocoagulation unit is shown which is the same as illustrated and described as the embodiment of FIGS. 12-15 in the U.S. Pat. No. 8,048,279, incorporated by reference herein, as set forth above. The exemplary electrocoagulation unit is shown as a device 200 with an integral housing which includes not only a reaction chamber 202 and development chamber 204, but also a secondary separation chamber 228. More specifically, the device 200 has a main chamber including two components, namely, the lower portion defined by reaction chamber 202 in which the electrolytic reaction takes place, and the development chamber 204 which extends above the upper edges of the reaction plates 218, as shown in FIG. 5.

A base portion 206 extends below the reaction chamber 202. An inlet tube 208 connects to the base 206 and provides the entering flow of liquid through the device. Optionally, a distributor tube 210 can be mounted within the base 206 in order to evenly distribute the flow of liquid. As shown in FIG. 4, the distributor 210 has a plurality of openings formed therein and extends perpendicular to the inlet tube 208. Another inlet tube 212 can also be provided to introduce air within the chamber in order to increase turbulence in the flow of liquid. As discussed above, turbulence increases the efficiency of the electrolytic process in some applications.

Additionally, introduction of turbulence into the liquid stream helps to break loose bubbles which form on the surfaces of the reaction plates. Excessive bubbles on the reaction plates hinder the electrolytic process because the bubbles reduce the volume of liquid flow through the reaction chamber. Turbulence introduced by air in the liquid stream helps to break up these bubbles.

The inlet tube 212 communicates with a distributor 214 having a plurality of openings which evenly distributes the introduction of air into the liquid stream. The distributor 214 can simply be an extension of inlet tube 212 which passes through an opening in the base 206. Similarly, in lieu of the perpendicular arrangement between tube 208 and distributor 210, tube 208 may be mounted in the sidewall of the base 206, and the distributor 210 can simply be an extension of the tube 208.

The reaction plates 218 are held in their position within the main chamber by spacers or guides 216 which are mounted on opposing vertical sidewalls of the reaction chamber 202. The spacers 216 shown in this embodiment extend substantially the height of the reaction plates 218. The lower outside edges of the reaction plates 218 rest upon ledges or flanges 220 which are simply the horizontal extensions formed above base 206. A plurality of openings 224 are formed on a lower flange 221 which is positioned below flange 220. As explained further below, bolts which may be connected to a source of power extend through openings 224. As with the other embodiments, a predetermined number of reaction plate tabs may be provided for the set of reaction plates used within the device. The number and spacing of the reaction plate tabs is dictated by the desired amperage and voltage within the electric field of the reaction chamber. FIGS. 4 and 5 illustrate five openings 224 which allow five plate tabs 222 connected to corresponding bolts or tab extensions 242 to extend from the device. However, the number of openings 224 and corresponding plate tabs 222 can be modified, depending on the desired characteristics of the electrical field within the reaction chamber 202.

There are a number of advantages of allowing the reaction plate tabs to extend downwardly. One advantage is that a development chamber may be provided directly above the reaction chamber wherein the development chamber simply constitutes an extension of the main chamber of the device, the development chamber being defined as a portion of the main chamber which extends above the upper edges of the reaction plates 218. Another advantage associated with the configuration of the device in FIG. 4 is that caustic conditions known in the art as etching can be minimized which extends the life of the reaction plate tabs. Any time the reaction plate tabs are subject to an air/liquid line, etching takes place which results in degradation of the reaction plate tabs, often causing them to prematurely break or degrade. Thus, reaction plate tabs which extend beyond the liquid line and have no protection at the air/liquid line can be subject to etching. One solution to the problem of etchings to simply coat the reaction plate tabs with a non-conductive material. However, this adds to the overall expense of the device by having to modify the reaction plates themselves. By having the reaction plate tabs contained within the housing and isolated from the amperage in the reaction chamber, the air/liquid line exposure is eliminated, thereby preventing etching.

The device 200 includes the integral secondary separation chamber 228 which lies adjacent the development chamber 204. The liquid flows over weir 226 and into the secondary separation chamber 228, and finally the liquid exits the device through outlet 230. A riser tube 232 of a selected height extends from the bottom wall of the secondary separation chamber 228. As the liquid flows over the weir 226 into the chamber 228, secondary separation of contaminants may occur wherein the contaminants collect on the bottom surface of the chamber 228. The riser tube 232 therefore prevents the contaminants from simply flowing through outlet tube 230 because many of the contaminants will settle to the bottom of the chamber 228. Line 237 represents a typical liquid line during operation. Preferably, liquid is allowed to flow over the weir 226 at a fairly uniform and constant rate. An upper flange 236 is provided for receiving the top cover 238. Another advantage of providing reaction plate tabs which extend downwardly into the bottom portion of the device is that the construction of the top cover 238 is simplified. That is, there is no requirement for openings or other features on the top cover 238. Furthermore, since there are no upward extending reaction plate tabs, a user is better able to view the device and observe the flow of liquid through the device.

Another feature which may be incorporated within the embodiment of FIG. 4 is a vacuum tube 234 which may be placed above the liquid line 237, the vacuum tube 234 extending through a selected sidewall of the secondary separation chamber 228. As with the previous embodiments, foam is created by the electrolytic process and the vacuum tube 234 can be used to facilitate extraction of the foam. Yet another feature that can be incorporated within the embodiment of FIGS. 4 and 5, as well as any of the other embodiments, is the use of a sonic cleaning device 250 (shown in FIG. 4). Power cord 252 delivers power to the cleaning device 250. The device 250 as shown can be placed under the plates and within the base 206. The device 250 can be powered by the same power source that delivers electricity to the plate tabs. This device assists in the cleaning of the reaction plates to ensure that the plates do not build up scale or mineral coatings which degrade the ability of the plates to be involved with electrocoagulation. Scale referred to herein is a coating or precipitate that becomes deposited on the plates because of their contact with minerals or chemicals in the liquid stream. Calcium carbonate is just one form of scaling that can form on the blades Electronic scale control units are available which provide small, compact solutions for scale control. These units utilize an oscillating electronic field through a modulation frequency waveform to produce inaudible sonic pulses that change the electrical and physical properties of scale crystals and other mineral crystals causing the crystal structures to be repelled from the plates. One commercially available electronic descaler that can be used is the DCS-100 electronic scaler sold by GI Industries of Monroe, Conn. Over time, it still may be necessary to acid wash the reaction plates 218. The construction of the reaction chamber which utilizes guides 216 to hold the reaction plates enables easy removal of the plates by simply lifting them out of the reaction chamber. If it is necessary to acid wash the reaction plates 218 having the tabs 222, bolts 242 must first be removed, and then the plates can be removed. It is also contemplated that the acid wash could take place within the reaction chamber with the plates remaining in place. This in-chamber cleaning requires a temporary shut down of the device, and the reaction chamber is filled with the desired acid bath.

Figure 6:
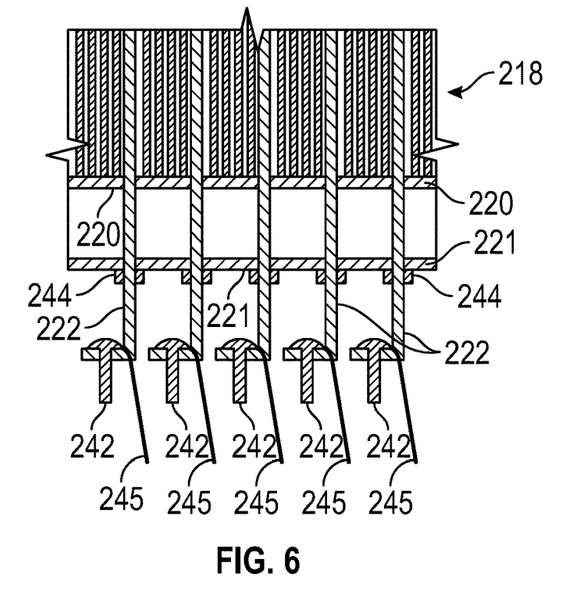
FIG. 6 is a greatly enlarged partial vertical section illustrating a plurality of reaction plates and selected reaction plates with reaction plate tabs which extend downwardly for allowing connection to a power source.
Figure 7:
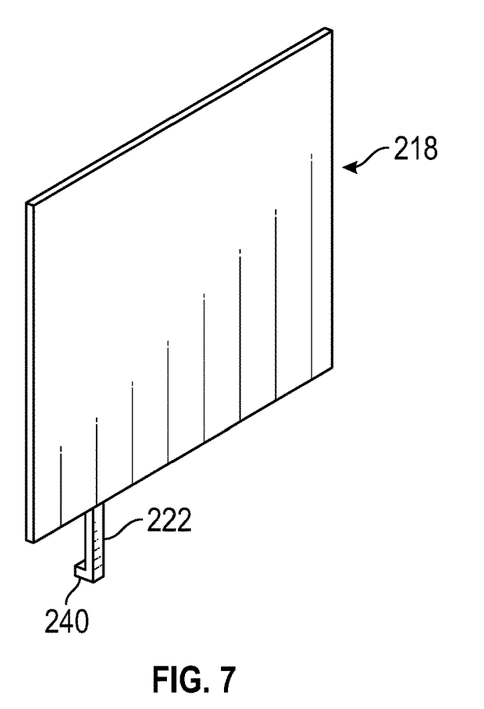
FIG. 7 is an enlarged perspective view of a reaction plate which includes a reaction plate tab.

FIG. 6 illustrates a plurality of reaction plates 218, along with selected reaction plates 218 also having integral plate tabs 222. FIG. 7 illustrates a reaction plate 218 including a reaction plate tab 222, which has its distal or free end bent at a 90 degree angle forming a small flange 240. A hole may be drilled through the flange 240 for receiving the corresponding bolt or tab extension 242 which attaches the corresponding electrical conductor 245 to the plate tab 222. In order to seal the plate tabs 222 with respect to the openings 224 formed in the device, individual gaskets 244 may be placed below the openings 224 which create a water tight seal thereby preventing leakage of fluid. In lieu of forming a bend or flange 240 in the tabs 222, the bolt could be directly welded to the tab on either side thereof. Those skilled in the art can envision other common ways in which the bolts 242 attach to their respective plate tabs 222.

According to another embodiment of the invention, the method also includes removal of nitrogen compounds including nitrates, nitrites, and urea. As electrocoagulation is conducted, these compounds precipitate out of the fluid stream. Nitrogen compounds can be precipitated from a stream by electrocoagulation with sufficient residence time in the reaction chamber in which the reduction of nitrogen can be reduced to nearly any desired level. However, after a period of time, such as approximately ten days, the treated stream will experience return of the concentration of nitrate compounds up to about one half of the original concentration. If a molar ratio of nitrogen, phosphate, and magnesium or calcium is added, and then electrocoagulation is conducted, then nitrate removal is not reversible over time.

The foregoing description has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A method for reducing a concentration of at least one ammonia-related species in an aqueous medium, comprising the steps of:
    a) providing a housing including a lower portion defining a reaction chamber, a base, and an upper portion defining a development chamber;
    b) arranging a plurality of reaction plates within the reaction chamber, the plates being vertically disposed in the reaction chamber and spaced apart from one another to create gaps between adjacent reaction plates;
    c) providing at least two reaction plate tabs connected to selected ones of the plurality of reaction plates, the reaction plate tabs extending through the lower portion of the housing;
    d) applying a DC voltage to the reaction plate tabs to create an electric field within the reaction chamber;
    e) passing a stream of the aqueous medium vertically through the reaction chamber in the gaps between reaction plates;
    f) adding a quantity of magnesium species and quantity of a phosphate species to the aqueous medium, such that a magnesium concentration and a phosphate concentration are each stoichiometrically equivalent to the concentration of the at least one ammonia-related species;
    g) conducting electrocoagulation of the aqueous medium, the electrocoagulation providing an energy of activation of a reaction between the magnesium species, the phosphate species, and the at least one ammonia-related species to form a struvite precipitate; and
    wherein the concentration of the at least one ammonia-related species in the aqueous medium after step g) is less than 0.6 mg/L or wherein the concentration of the at least one ammonia-related species in the aqueous medium after step g) is at least as low as 5.9 mg/L and as low as 0.06 mg/L.

2. The method of claim 1, wherein the reaction plates are consumable and, in step f), give up ions whereby the reaction plates are consumed over time, and wherein the ammonia-related species further react with the ions given up by the reaction plates.

3. The method of claim 1, wherein the concentration of the at least one ammonia-related species in the aqueous medium is less than about 0.06 mg/L after step f).

4. The method of claim 1, wherein the method is carried out in the substantial absence of pH adjustment.

5. The method of claim 1, wherein a pH of the aqueous medium, during step f), is less than 7.

6. The method of claim 1, wherein the at least one ammonia-related species comprises at least one selected from the group consisting of ammonia, an ammonium salt, and urea.

7. The method of claim 1, further comprising applying a vacuum to the reaction chamber.

8. The method of claim 1, further comprising filtering the stream prior to step d).

9. The method of claim 1, further comprising pumping the stream through the reaction chamber.

10. The method of claim 1, further comprising maintaining a desired pressure within the reaction chamber.

11. The method of claim 1, further comprising removing spent reaction plates from the reaction chamber and replacing the reaction plates with new reaction plates.

12. The method of claim 1, wherein at least one of the magnesium species and the phosphate species is added to the aqueous medium via a venturi.

13. The method of claim 1, wherein step c) comprises the sub-steps of:
    c1) receiving a constant AC line voltage; and
    c2) rectifying the AC line voltage to the DC voltage.

14. The method of claim 1, wherein the electric field further includes a first electric field and a second electric field, the first electric field existing between a first plurality of reaction plates and having a first voltage and a first amperage, the second electric field existing between a second plurality of reaction plates and having a second voltage and a second amperage, wherein the first and second voltages are different and the first and second amperages are different.

15. The method of claim 1, further comprising, after step f), flowing the aqueous medium into a settling vessel, wherein at least one of the struvite precipitate and an electrocoagulated contaminant settles out of the aqueous medium.

16. The method of claim 1, further comprising venting gases created in step f) to a top of the reaction chamber by buoyancy.

17. The method, as claimed in claim 1, further including: reversing a polarity of the applied DC voltage.

18. The method, as claimed in claim 17, further including: continually reversing the polarity of the applied DC voltage within about one minute time periods.

19. A method, as claimed in claim 1, further including: precipitation of nitrogen compounds by the conducting electrocoagulation step, and wherein the nitrogen compounds at least include nitrates, nitrites, and urea.

20. A system for reducing a concentration of at least one ammonia-related species in an aqueous medium, comprising:
- a housing including a lower portion defining a reaction chamber, a base, and an upper portion defining a development chamber;
- a plurality of reaction plates arranged within the reaction chamber, the plates being vertically disposed in the reaction chamber and spaced apart from one another to create gaps between adjacent reaction plates;
- at least two reaction plate tabs connected to selected ones of the plurality of reaction plates, the reaction plate tabs extending through the lower portion of the housing;
- a DC voltage applied to the reaction plate tabs to create at least one electric field within the reaction chamber;
- a stream of an aqueous medium passed vertically through the reaction chamber in the gaps between reaction plates;
- a quantity of a magnesium species and a quantity of a phosphate species added to the aqueous medium, such that a magnesium concentration and a phosphate concentration are each stoichiometrically equivalent to a concentration of the at least one ammonia-related species; and
- wherein electrocoagulation of the aqueous medium is conducted, the electrocoagulation providing an energy of activation of a reaction between the magnesium species, the phosphate species, and the at least one ammonia-related species to form a struvite precipitate, and wherein a concentration of the at least one ammonia-related species in the aqueous medium after electrocoagulation is less than 0.6 mg/L or wherein the concentration of the at least one ammonia-related species in the aqueous medium after electrocoagulation is at least as low as 5.9 mg/L and as low as 0.06 mg/L.

21. A system for reducing a concentration of at least one ammonia-related species in an aqueous medium, comprising:
- an electrocoagulation unit comprising: a housing including a lower portion defining a reaction chamber, a base, and an upper portion defining a development chamber; a plurality of reaction plates arranged within the reaction chamber, the plates being vertically disposed in the reaction chamber and spaced apart from one another to create gaps between adjacent reaction plates; at least two reaction plate tabs connected to selected ones of the plurality of reaction plates, the reaction plate tabs extending through the lower portion of the housing; a DC voltage applied to the reaction plate tabs to create at least one electric field within the reaction chamber; a stream of an aqueous medium passed vertically through the reaction chamber in the gaps between reaction plates; a quantity of a magnesium species and a quantity of a phosphate species added to the aqueous medium, such that a magnesium concentration and a phosphate concentration are each stoichiometrically equivalent to a concentration of the at least one ammonia-related species, wherein electrocoagulation of the aqueous medium is conducted, the electrocoagulation providing an energy of activation of a reaction between the magnesium species, the phosphate species, and the at least one ammonia-related species to form a struvite precipitate, and wherein a concentration of the at least one ammonia-related species in the aqueous medium after electrocoagulation is less than 0.6 mg/L or wherein the concentration of the at least one ammonia-related species in the aqueous medium after electrocoagulation is at least as low as 5.9 mg/L and as low as 0.06 mg/L;
- a base tank containing a base of a sufficient concentration to drive formation of struvite;
- an acid tank containing an acid with a stoichiometric balance with the base to drive the formation of the struvite, said base tank and acid tank having a line communicating with the electrocoagulation unit to deliver a selected and metered amount of the base and acid to the aqueous medium;
- at least one clarification tank communicating with a treated outflow of the aqueous medium from the electrocoagulation unit in which the at least one ammonia-related species ammonia has been precipitated; and
- a drying bed for receiving sludge exiting the at least one clarification.

\* \* \* \* \*